(12) United States Patent
Stephens et al.

(10) Patent No.: US 6,600,920 B1
(45) Date of Patent: Jul. 29, 2003

(54) METHOD OF AND SYSTEM FOR DELIVERING WIRELESS CALLS

(75) Inventors: Gary Boyd Stephens, Richardson, TX (US); Andrew Silver, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/321,865

(22) Filed: May 28, 1999

Related U.S. Application Data

(60) Provisional application No. 60/094,531, filed on Jul. 29, 1998.

(51) Int. Cl.[7] ................................................. H04Q 7/00
(52) U.S. Cl. ........................................ 455/422; 445/458
(58) Field of Search ................................ 455/422, 434, 455/435, 432, 445, 458, 450, 433; 340/10.1, 10.2, 10.4

(56) References Cited

U.S. PATENT DOCUMENTS 5,369,681 A * 11/1994 Boudreau et al. ........... 455/458
5,369,684 A * 11/1994 Buhl et al. .................. 455/450
5,884,180 A * 3/1999 Bertacchi ..................... 455/458
6,122,509 A * 9/2000 Nguyen ....................... 455/433

OTHER PUBLICATIONS

Peter Rysavy, *Rysavy Research*, for PCS Data Today online journal, Sep. 30, 1998.

* cited by examiner

*Primary Examiner*—Thanh Cong Le
(74) *Attorney, Agent, or Firm*—John D. Crane; Bracewell & Patterson, L.L.P.

(57) ABSTRACT

A system for delivering a call to a mobile unit in a wireless network includes a mobile switching center that receives a call setup request message initiated in response to a request from an originating mobile switching center. The receiving mobile switching center initiates setting up the call between the receiving mobile switching center and the mobile unit before the call is setup between the receiving mobile switching center and the originating mobile switching center. Preferably, the receiving mobile switching center initiates setting up the call by issuing a page in response to receiving the call setup message.

12 Claims, 9 Drawing Sheets

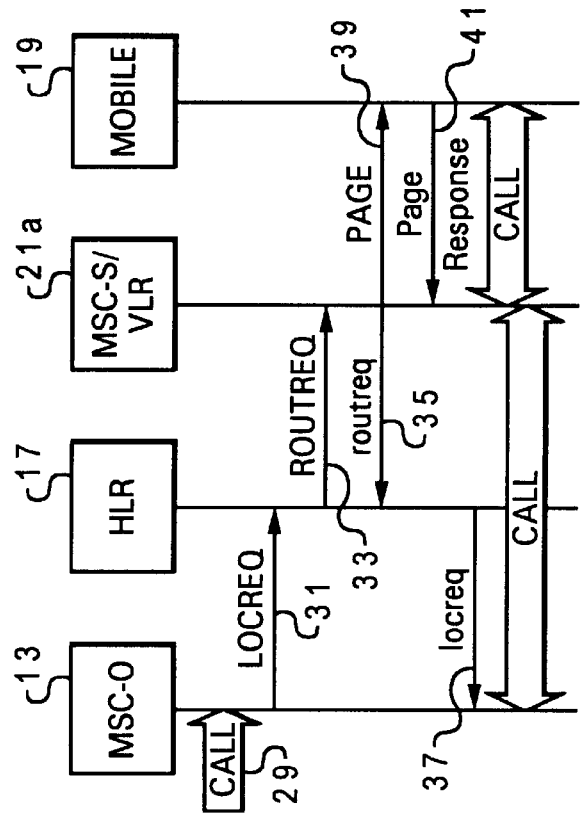
Fig. 3
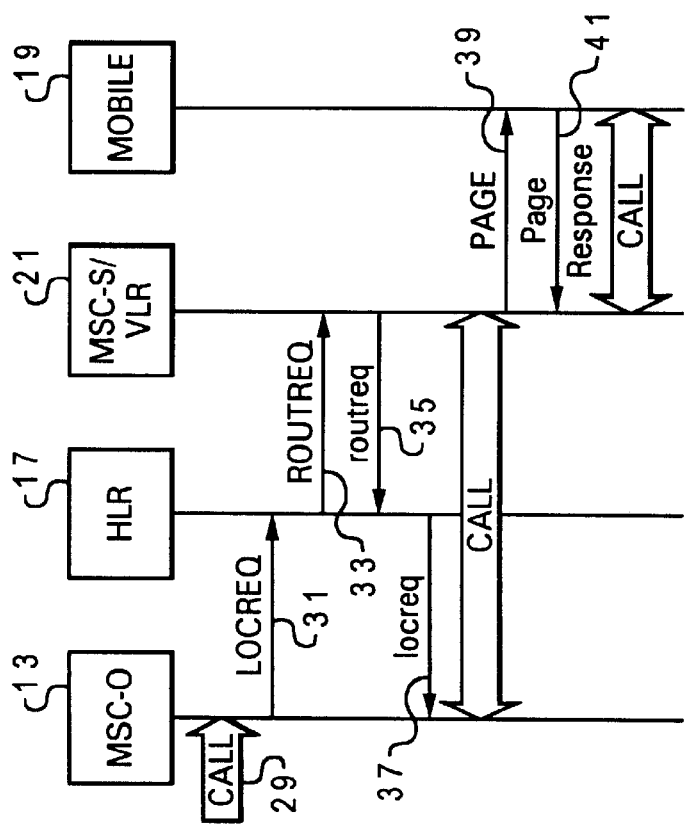
Fig. 2 *Prior Art*

METHOD OF AND SYSTEM FOR DELIVERING WIRELESS CALLS

CROSS-REFERENCE TO RELATED APPLICATION

The present application claims the benefit of Provisional Application Serial No. 60/094,531, filed Jul. 29, 1998.

FIELD OF THE INVENTION

The present invention relates generally to the field of wireless telecommunications, and more particularly to a method of and system for delivering calls to a mobile unit in a wireless telecommunications system with improved call setup time.

DESCRIPTION OF THE PRIOR ART

Wireless telecommunications services are growing at a tremendous rate. Users have embraced the concept of having a telephone that is with them all the time. Mobile telecommunications systems provide users with the ability to receive telephone calls, faxes, pages, and short messages at virtually any location in the country. The development of general packet radio service (GPRS) system will enable users to receive high-speed data in wireless environment, and thereby access the Internet or other data networks from virtually any location.

One of the drawbacks associated with wireless telecommunications is the relative slowness of call delivery. In order to terminate a call to a mobile unit, a substantial amount of signaling is required. The termination time is increased when the mobile unit has roamed outside its home area. The mobile unit must be located and the call must be setup over multiple system links. Termination time is even slower in the case of GPRS terminations. In GPRS systems, the mobile unit is paged on a packet control channel (PCCH), which is the control channel associated with the data session side of the system. When the mobile unit is paged on the PCCH for a telephone call, the mobile unit must retune to the digital control channel (DCCH) in order to respond to page and proceed with call setup. In addition to the time spent retuning, there is a substantial amount of additional signaling associated with terminations of calls in a GPRS system.

Callers to mobile units may find the slow setup time annoying. Callers may even believe that an error has occurred and that the call will not be completed at all. Accordingly, it is an object of the present invention to provide a system and method for reducing the time required to complete calls to mobile units.

SUMMARY OF THE INVENTION

The present invention provides an improved method of and system for delivering a call to a mobile unit in a wireless network. The system includes a mobile switching center that receives a call setup request message initiated in response to a request from an originating mobile switching center. The receiving mobile switching center initiates setting up the call between the receiving mobile switching center and the mobile unit before completion of call setup between the receiving mobile switching center and the originating mobile switching center. Preferably, the receiving mobile switching center initiates setting up the call by issuing a page in response to receiving the call setup message.

The present invention is broadly applicable to all wireless telecommunications systems. For example, the receiving mobile switching center may be a serving mobile switching center that issues a page to a mobile unit. Alternatively, the receiving mobile switching center may be an anchor mobile switching center that issues an ISPAGE2 to a boundary mobile switching center. In the general packet radio service (GPRS) environment, the receiving mobile switching center may be a gateway mobile switching center that issues an ISPAGE2 to a serving mobile switching center and a hard page to a serving GPRS support node.

BRIEF DESCRIPTION OF THE DRAWINGS

FIG. 2 is a call flow diagram of a call delivery in a system of the type illustrated in FIG. 1 according to the prior art.

FIG. 3 is a call flow diagram of a call delivery in a system of the type illustrated in FIG. 1 according to the present invention.

DESCRIPTION OF THE PREFERRED EMBODIMENT

Figure 1:
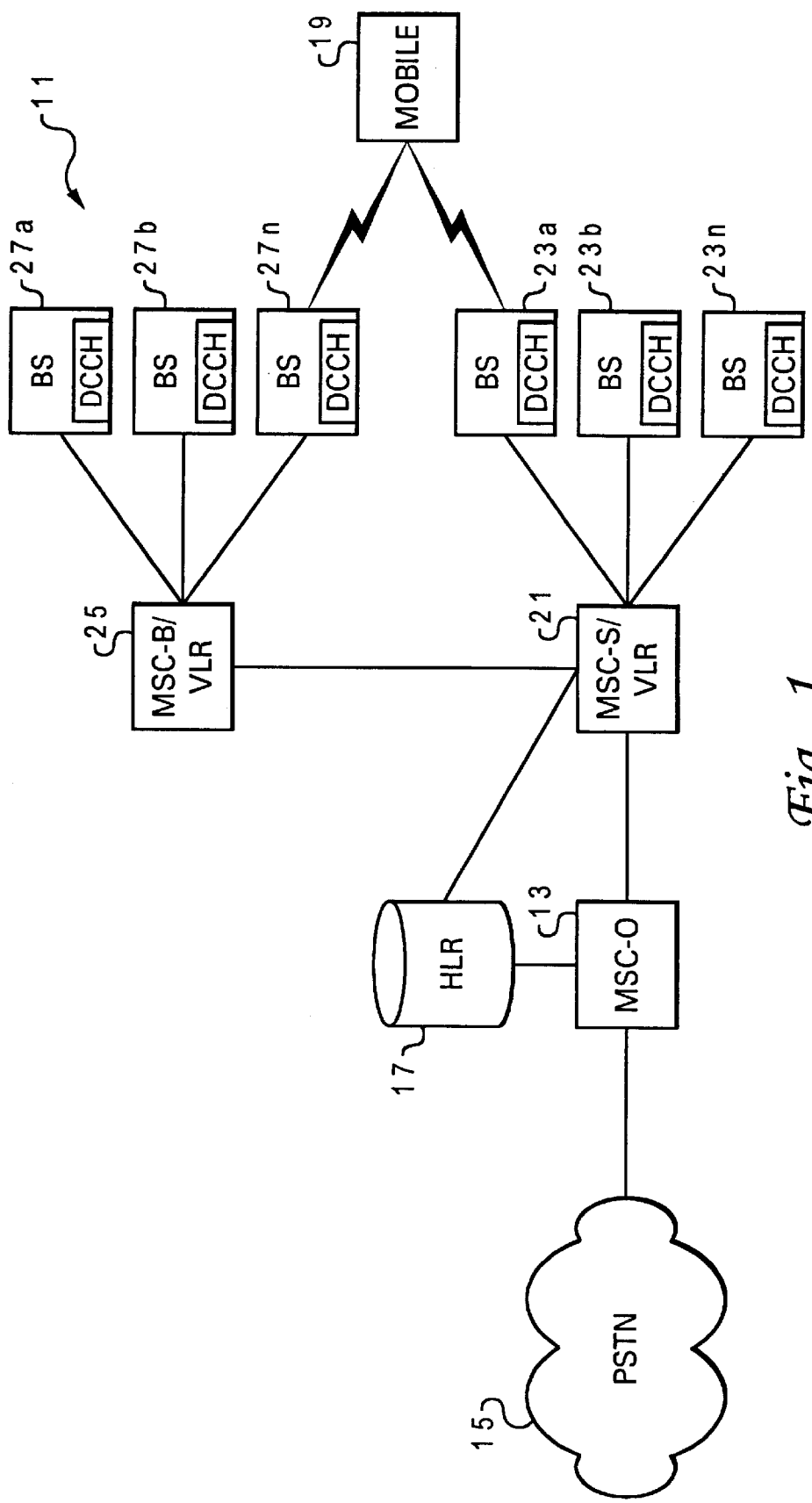
FIG. 1 is a block diagram of a typical wireless telecommunications system.

Referring now to the drawings, and first to FIG. 1, a wireless telecommunications system is designated generally by the numeral 11. System 11 includes an originating mobile switching center (MSC-O) 13. MSC-O 13 provides an interface between the public switched telephone network (PSTN) 15 and wireless system 11. MSC-O 13 accesses a home location register (HLR) 17 for mobile subscriber information and the current location of a mobile unit 19.

When mobile unit 19 is outside its home area, it registers with, and is served by, a serving mobile switching center and visitor location register (MSC-S/VLR) 21. When mobile unit 19 registers with MSC-S/VLR 21, the VLR informs HLR 17 of the current location of mobile 19 and HLR 17 downloads subscriber information for mobile unit 19 to the VLR. When MSC-O 13 receives a call to mobile unit 19, the call is delivered to MSC-S 21, and a base station 23 pages mobile unit 19 over a digital control channel (DCCH). If mobile unit 19 is still in the area served by the paging base station, call completion proceeds.

Occasionally, mobile unit 19 will have moved into a border area without having changed its area of registration. In order to accommodate such instances, MSC-S 21 sends a special paging message (ISPAGE2) to a border mobile switching center (MSC-B) 25 substantially simultaneously with sending the page to mobile unit 19. MSC-B 25 sends a page to base stations 27, which in turn attempt to page mobile unit 19 on their digital control channels. When mobile unit 19 responds to the page, call completion proceeds.

Referring now FIG. 2, there is shown a call flow diagram of a call completion according to the prior art in a system of the type illustrated in FIG. 1. A call 29 is received at MSC-O 13. MSC-O 13 sends a location request (LOCREQ) message 31 to HLR 17. HLR 17 determines that mobile unit 19 is registered with MSC-S 21. Accordingly, HLR 17 sends a routing request (ROUTREQ) message 33 to MSC-S 21.

According to the prior art, the receipt of the ROUTREQ message at MSC-S 21 triggers a routing request return result (routreq) 35 back to HLR 17. Upon receipt of the routreq 35, HLR 17 sends a location request return result (locreq) 37 back to MSC-O 13. When MSC-O 13 receives locreq 37, the call is connected between MSC-O 13 and MSC-S 21. When MSC-S 21 receives the call, MSC-S 21 sends a PAGE 39 to mobile unit 19. As will be discussed in connection with FIG. 4, MSC-S 21 also sends an ISPAGE2 to an MSC-B 25. When mobile unit 19 receives page 39, mobile unit 19 responds with a page response 41 back to MSC-S 21. Upon receipt of the page response 41, the call is connected between MSC-S 21 and mobile unit 19, thus connecting the calling party with mobile unit 19. From the foregoing, it may be seen that in the prior art, the call is set up completely between MSC-O 13 and MSC-S 21, before call setup is even initiated between MSC-S 21 and mobile unit 19 Referring to now FIG. 3, there is shown a call flow of one embodiment of a call completion according to be present invention. Again, call 29 is received at MSC-O 13. MSC-0 13 sends a LOCREQ message 31 to HLR 17. Again, HLR 17 determines that mobile unit 19 is registered with MSC-S 21. Accordingly, HLR 17 sends a ROUTREQ message 33 to an MSC-S 21a of the present invention.

According to the present invention, the receipt of the ROUTREQ message at MSC-S 21a triggers substantially simultaneously a PAGE 39 to mobile unit 19 and a routreq 35 back to HLR 17. Then, the completion of call setup between MSC-0 13 and MSC-S 21a, and the call setup between MSC-S 21a and mobile unit 19 then proceed independently and concurrently along separate paths. Upon receipt of the routreq 35, HLR 17 sends a locreq 37 back to MSC-0 13. When MSC-0 13 receives locreq 37, the call is connected between MSC-0 13 and MSC-S 21.

Concurrently, when mobile unit 19 receives PAGE 39, mobile unit 19 responds with a page response 41 back to MSC-S 21. Upon receipt of the page response 41, the call is connected between MSC-S 21 and mobile unit 19. According to the present invention, the call may finish being setup between MSC-S 21a and mobile unit 19 before the call setup is completed between MSC-O 13 and MSC-S 21a. When both parts of the call are setup, the calling party is connected to mobile unit 19.

Figure 4:
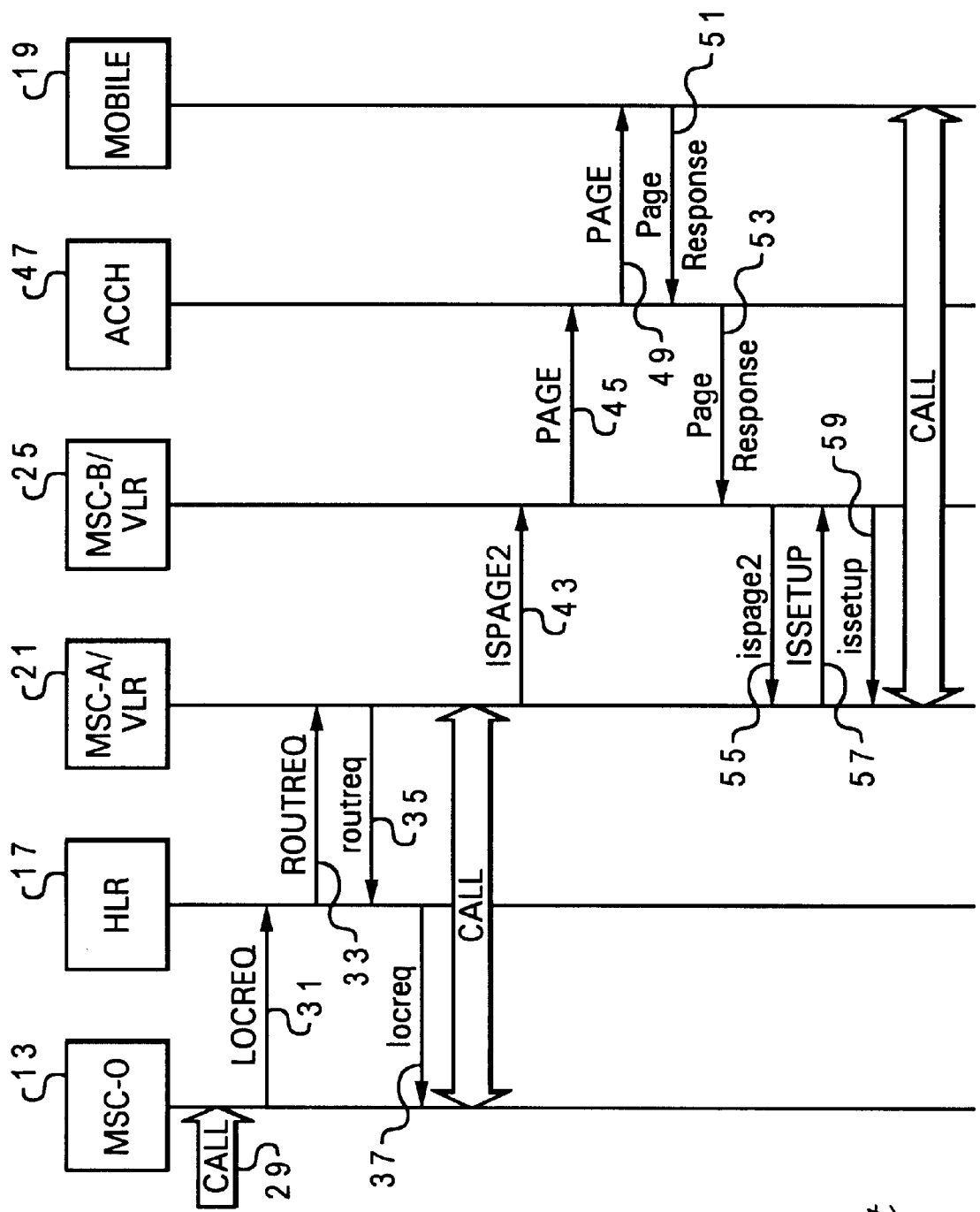
FIG. 4 is a call flow diagram of an alternative call delivery in a system of the type illustrated in FIG. 1 according to the prior art.

Referring now FIG. 4, there is shown a call flow diagram of an alternative call completion according to the prior art in a system of the type illustrated FIG. 1. Again, call 29 is received at MSC-O 13. MSC-O 13 sends a LOCREQ 31 to HLR 17. HLR 17 determines that mobile unit 19 is registered with MSC-S 21, which in the embodiment of FIG. 4 becomes an anchor mobile switching center (MSC-A). Accordingly, HLR 17 sends a ROUTREQ 33 to MSC-A 21. Again, according to the prior art, the receipt of the ROUTREQ at MSC-A 21 triggers a routreq 35 back to HLR 17. Upon receipt of the routreq 35, HLR 17 sends a locreq 37 back to MSC-O 13. When MSC-0 13 receives locreq 37, the call is connected between MSC-O 13 and MSC-A 21. When MSC-A 21 receives the call, MSC-A 21 sends an ISPAGE2 43 to MSC-B 25 (as well as a PAGE to mobile unit 19, as discussed with respect to FIG. 2). MSC-B 25 sends a PAGE 45 to base station ACCH 47, which in turn sends a PAGE 49 to mobile unit 19. When mobile unit 19 receives PAGE 49, mobile unit 19 responds with a page response 51 back to ACCH 47, which in turn sends a page response 53 back to MSC-B 25. Upon receipt of page response 53, MSC-B 25 sends an ispage2 return result 55 back to MSC-A 21. MSC-A then sends an ISSETUP message 57 to MSC-B 25. When MSC-B 25 responds with an issetup return result 59 the call is connected between MSC-A 21 and mobile unit 19, thus connecting the calling party with mobile unit 19. From the foregoing, it may again be seen that in the prior art, the call is set up completely between MSC-O 13 and MSC-A 21, before call setup is even initiated between MSC-A 21 and mobile unit 19.

Figure 5:
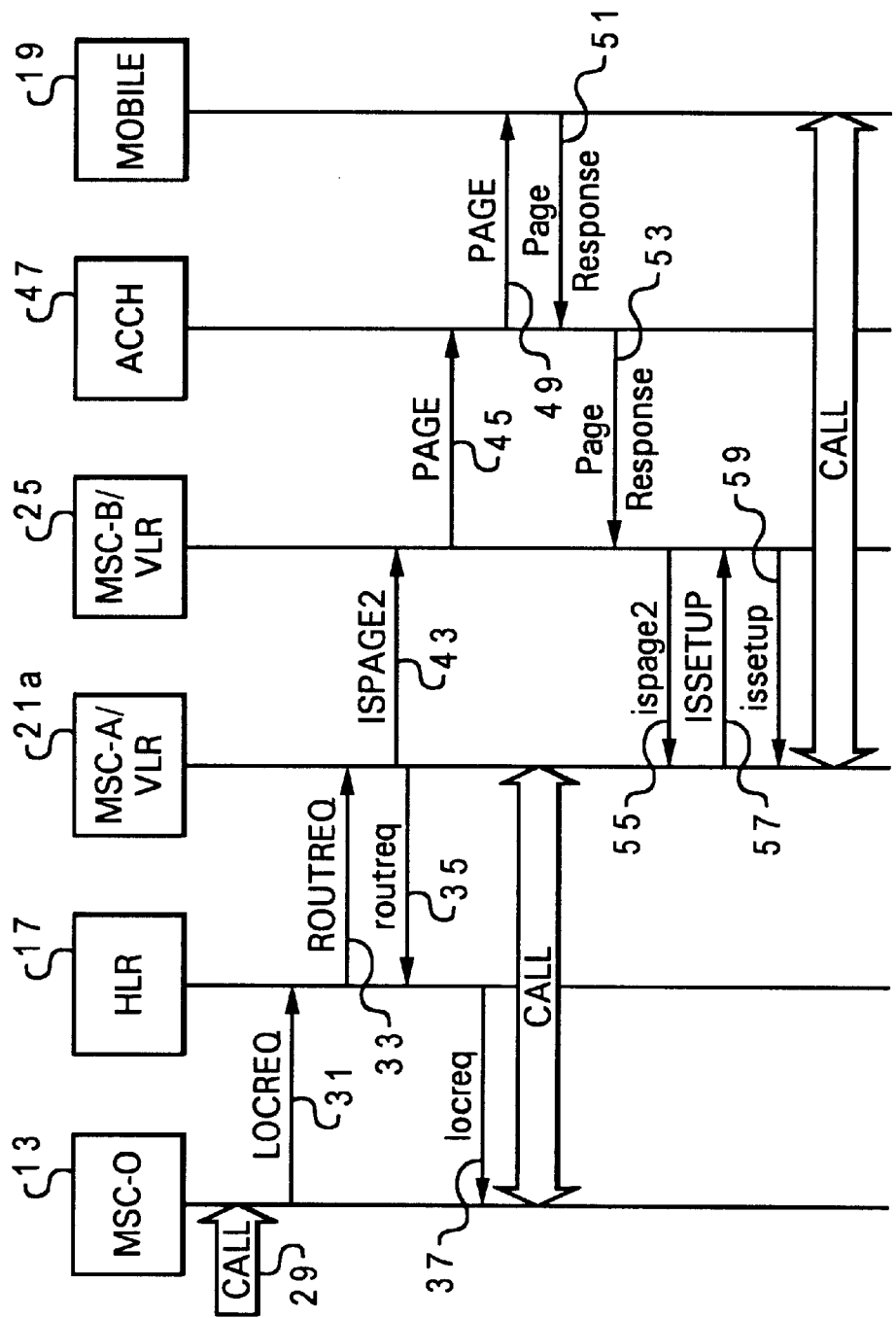
FIG. 5 is a call flow diagram of an alternative call delivery in a system of the type illustrated in FIG. 1 according to the present invention.

Referring to now FIG. 5, there is shown a call flow of an alternative embodiment of a call completion according to be present invention. Again, a call 29 is received at MSC-O 13. MSC-O 13 sends a LOCREQ message 31 to HLR 17. Again, HLR 17 determines that mobile unit 19 is registered with MSC-A 21. Accordingly, HLR 17 sends a ROUTREQ message 33 to an MSC-A 21a of the present invention.

According to the present invention, the receipt of the ROUTREQ message at MSC-S 21a triggers substantially simultaneously an ISPAGE2 43 to MSC-B 25 (as well as a PAGE described with respect to FIG. 4), and a routreq 35 back to HLR 17. Then, the completion of call setup between MSC-O 13 and MSC-A 21a, and the call setup between MSC-A 21a and mobile unit 19 proceed independently and concurrently along separate paths. Upon receipt of the routreq 35, HLR 17 sends a locreq 37 back to MSC-O 13. When MSC-O 13 receives locreq 37, the call is connected between MSC-O 13 and MSC-A 21.

Concurrently, When MSC-B 25 receives ISPAGE2 43, MSC-B 25 sends a PAGE 45 to base station ACCH 47, which in turn sends a PAGE 49 to mobile unit 19. When mobile unit 19 receives PAGE 49, mobile unit 19 responds with a page response 51 back to ACCH 47, which in turn sends a page response 53 back to MSC-B 25. Upon receipt of page response 53, MSC-B sends an ispage2 return result 55 back to MSC-A 21. MSC-A then sends an ISSETUP message 57 to MSC-B 25. When MSC-B 25 responds with an issetup return result 59 the call is connected between MSC-A 21 and mobile unit 19. When both parts of the call are setup, the calling party is connected to mobile unit 19.

Figure 6:
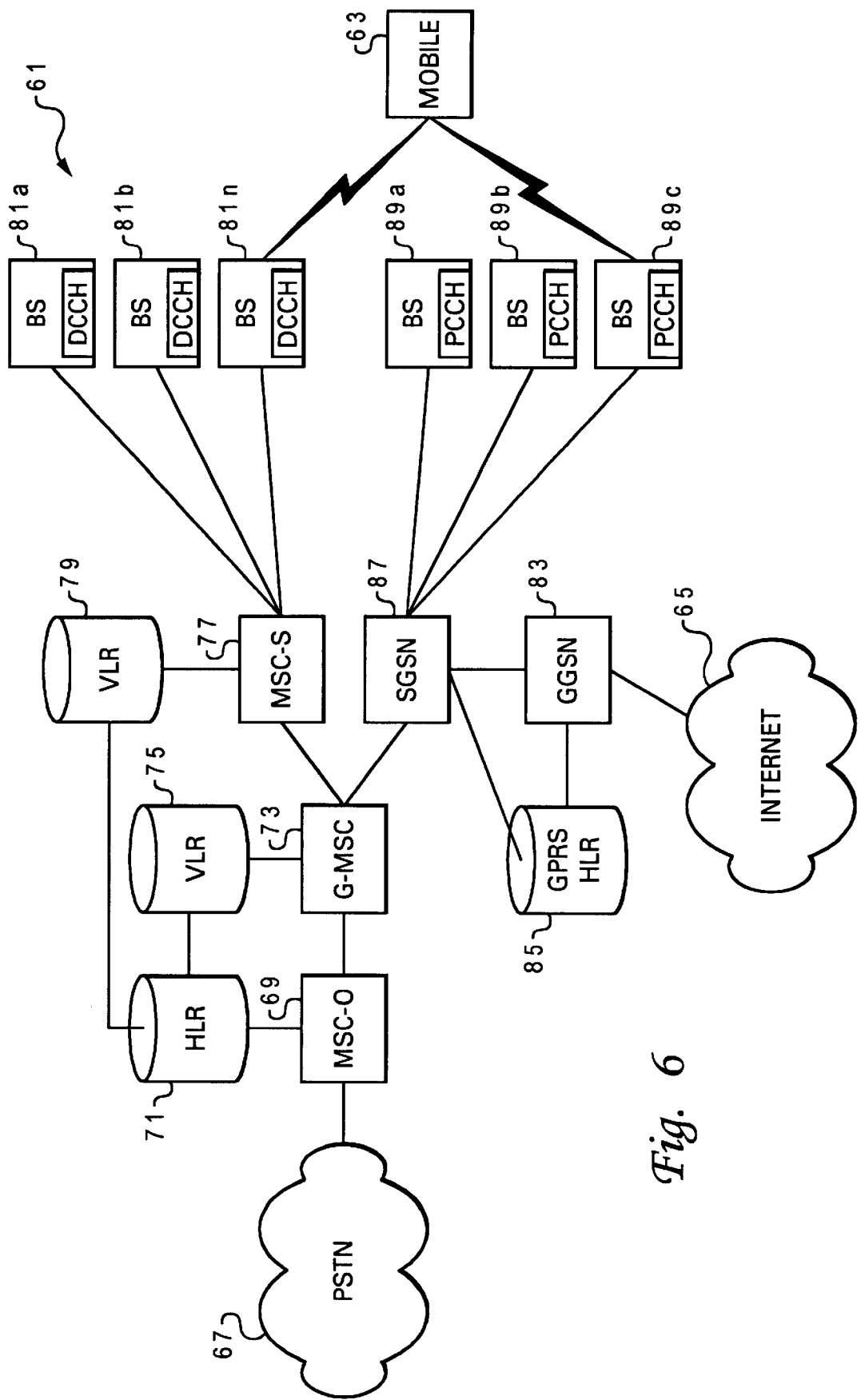
FIG. 6 is a block diagram of a general packet radio service (GPRS) system.

Referring now to FIG. 6, a general packet radio service (GPRS) system is designated generally by the numeral 61. GPRS system 61 enables a mobile unit 63 to access both a data network, such as the Internet 65, and the public switched telephone network (PSTN) 67. An originating mobile switching center (MSC-O) 69 provides an interface between GPRS system 61 and PSTN 67. An HLR 71 provides MSC-O 69 with subscriber and location information for the mobile units in its home area. A gateway mobile switching center (G-MSC) 73 is connected to MSC-O 69 and a visitor location register (VLR) 75 provides HLR 71 with location information for mobile unit 63. A serving mobile switching center (MSC-S) 77 is connected to G-MSC 73 and a VLR 75 provides location information to HLR 71. MSC-S 77 is connected to a plurality of base stations 81, which use digital control channels (DCCHs) for paging and registration of mobile units in their respective areas.

A gateway GPRS support node (GGSN) 83 provides the interface between Internet 65 and GPRS system 61. A GPRS HLR 85 provides GGSN 83 with location and subscriber information. GGSN 83 and GPRS HLR 85 are in communication with a serving GPRS support node (SGSN) 87, which communicates with mobile units in its area through a plurality of base stations 89. Base stations 89 use packet control channels (PCCHs) for paging and registration of mobile units in their respective areas.

Figure 7:
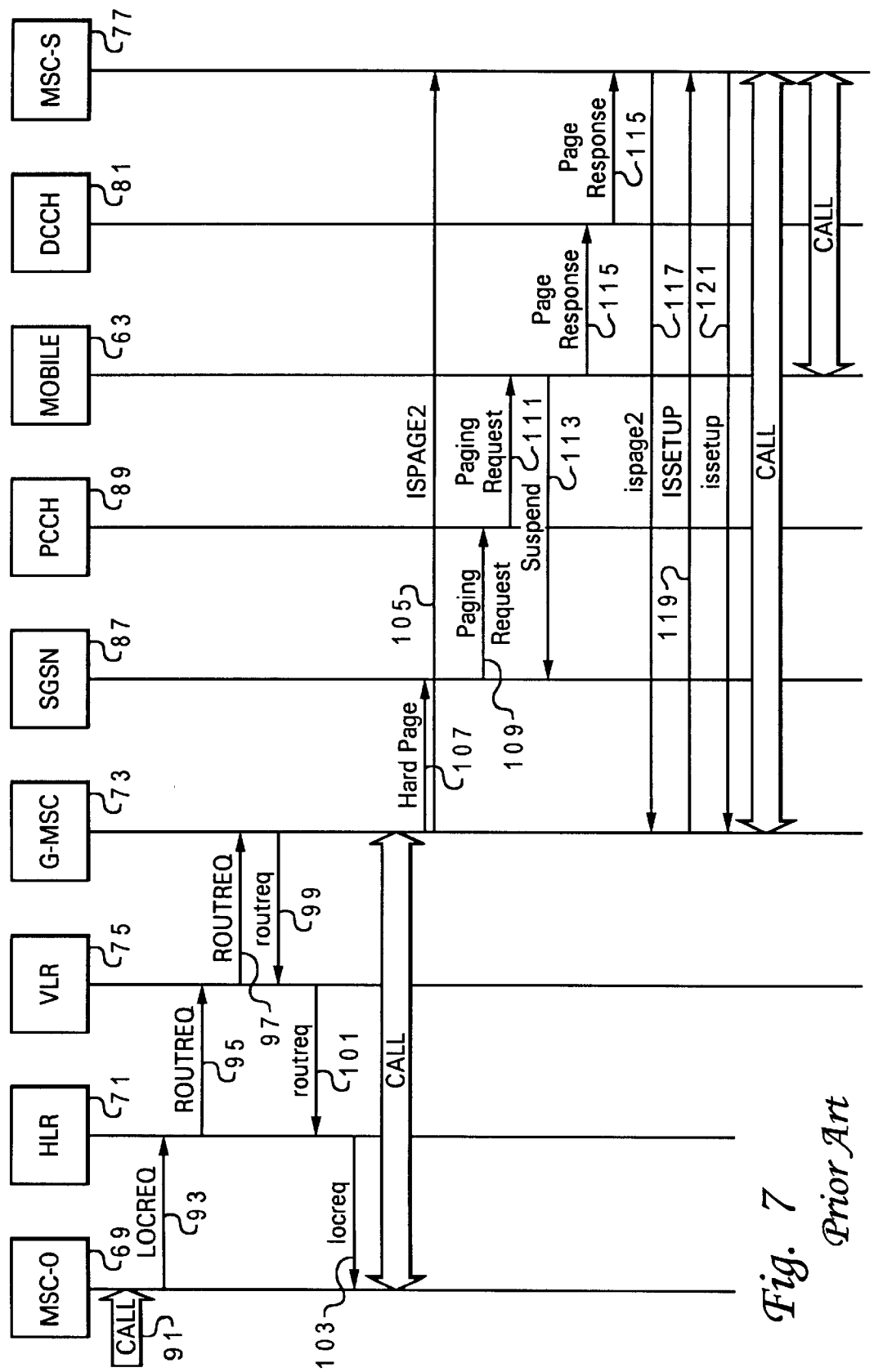
FIG. 7 is a call flow diagram of a call delivery in a system of the type illustrated in FIG. 6 according to the prior art.

Referring now to FIG. 7, there is shown a call flow diagram of a call completion according to the prior art in a GPRS system of the type illustrated FIG. 6. A call 91 to mobile unit 63 is received-at MSC-O 69. MSC-O 69 sends a LOCREQ 93 to HLR 71. HLR 71 determines that mobile unit 63 is registered with VLR 75. Accordingly, HLR 71 sends a ROUTREQ 95 to VLR 75, which in turn sends a ROUTREQ 97 to G-MSC 73. According to the prior art, the receipt of ROUTREQ 97 at G-MSC 73 triggers a routreq 99 back to VLR 75, which in turn sends a routreq 101 back to HLR 71. Upon receipt of the routreq 101, HLR 71 sends a locreq 103 back to MSC-O 69. When MSC-O 69 receives locreq 103, the call is connected between MSC-O 69 and G-MSC 73.

In the GPRS system, a mobile unit is normally tuned to a packet control channel (PCCH). Accordingly, when a call is to be terminated to mobile unit 63, mobile unit 63 must be instructed to retune to a digital control channel (DCCH). When G-MSC 73 receives the call, G-MSC 73 substantially simultaneously sends an ISPAGE2 105 to MSC-S 77 and a hard page 107 to SGSN 87. The ISPAGE2 alerts MSC-S 77 that it will receive a call for mobile unit 63. Upon receipt of hard page 107, SGSN 87 sends a paging request 109 to PCCH 89, which forwards a paging request 111 to mobile unit 63. Mobile unit 63 responds to SGSN 87 with suspend response 113, which indicates to SGSN 87 that mobile unit 63 is changing from data session mode to circuit mode, and retunes to the DCCH frequency. Then, mobile unit 63 sends a page response 115 on DCCH 81 to MSC-S 77. Upon receipt of page response 115, MSC-S 77 sends an ispage2 return result 117 back to G-MSC 73. G-MSC 73 then sends an ISSETUP message 119 to MSC-S 77. When MSC-S 77 responds with an issetup return result 121, the call is connected between G-MSC 73 and mobile unit 63, thus connecting the calling party with mobile unit 63. From the foregoing, it may again be seen that in the prior art, the call is set up completely between MSC-O 69 and G-MSC 73, before call setup is even initiated between G-MSC 73 and mobile unit 63.

Figure 8:
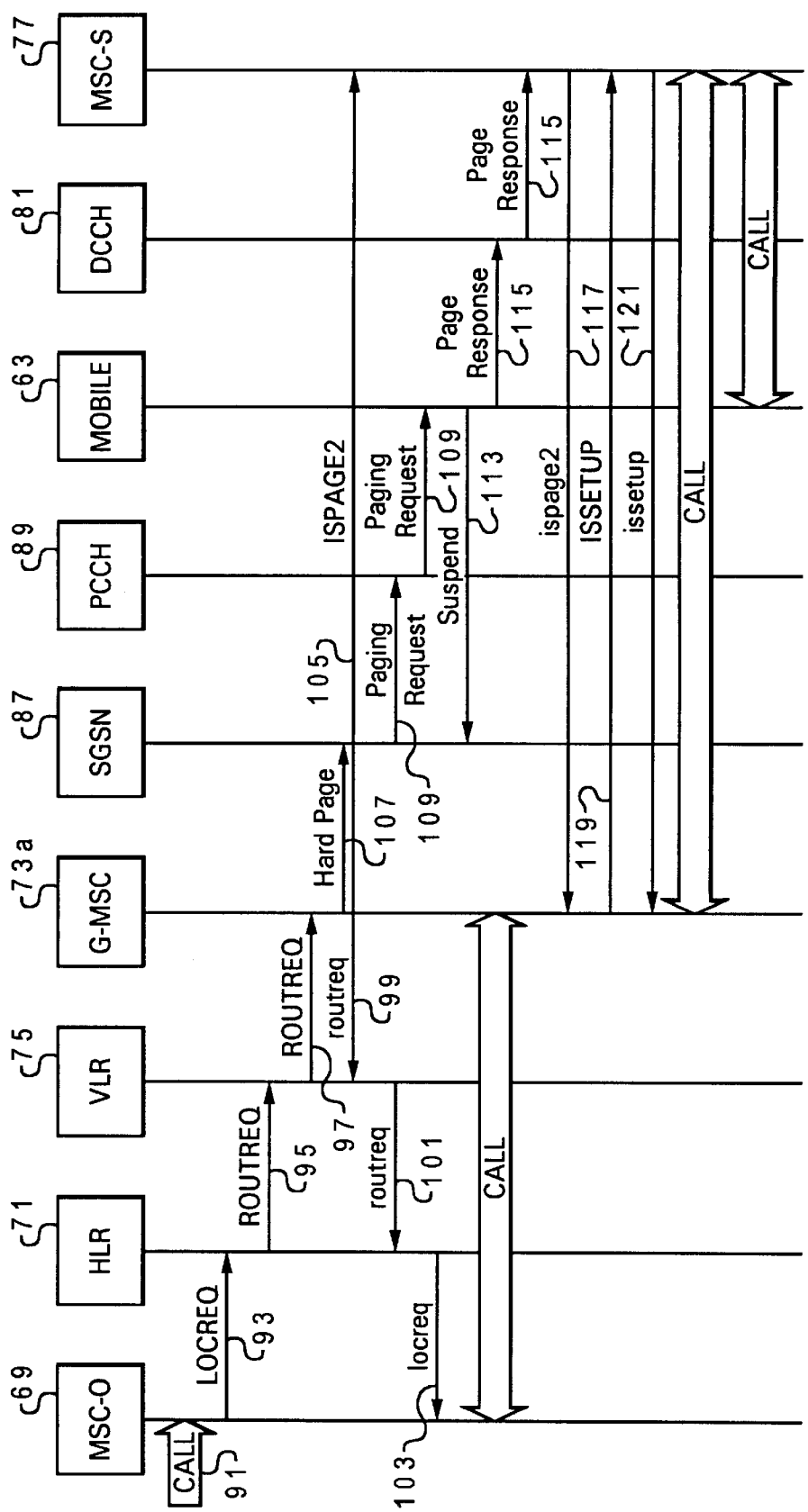
FIG. 8 is a call flow diagram of a call delivery in a system of the type illustrated in FIG. 6 according to the present invention.

Referring now to FIG. 8, there is shown a call flow diagram of a call completion according to the present invention in a GPRS system of the type illustrated FIG. 6. Again, call 91 to mobile unit 63 is received at MSC-O 69. MSC-O 69 sends a LOCREQ 93 to HLR 71. HLR 71 determines that mobile unit 63 is registered with VLR 75 and sends a ROUTREQ 95 to VLR 75, which in turn sends a ROUTREQ 97 to G-MSC 73*a*.

According to the present invention, the receipt of ROUTREQ 97 at G-MSC 73*a* substantially simultaneously triggers both an ISPAGE2 message to MSC-S 77 and a hard page 107 to SGSN 87, as well as a routreq 99 back to VLR 75. Then, according to the present invention and generally in the manner described with respect to FIGS. 3 and 5, the completion of call setup between MSC-O 69 and G-MSC 73*a*, and the call setup between G-MSC 73*a* and mobile unit 63 proceed independently and concurrently along separate paths. VLR 75 sends a routreq 101 back to HLR 71. Upon receipt of the routreq 101, HLR 71 sends a locreq 103 back to MSC-O 69. When MSC-O 69 receives locreq 103, the call is connected between MSC-O 69 and G-MSC 73*a*.

Concurrently, the receipt of ISPAGE2 105 alerts MSC-S 77 that it will receive a call for mobile unit 63. Upon receipt of hard page 107, SGSN 87 sends a paging request 109 on PCCH 89 to mobile unit 63. Mobile unit 63 responds to SGSN 87 with a suspend return result 113, and retunes to the DCCH frequency. Then, mobile unit 63 sends a page response 115 on DCCH 81 to MSC-S 77. Upon receipt of page response 115, MSC-S 77 sends an ispage2 return result 117 back to G-MSC 73*a*. G-MSC 73*a* then sends an ISSETUP message 119 to MSC-S 77. When MSC-S 77 responds with an issetup return result 121 the call is connected between G-MSC 73*a* and mobile unit 63, thus connecting the calling party with mobile unit 63.

Figure 9:
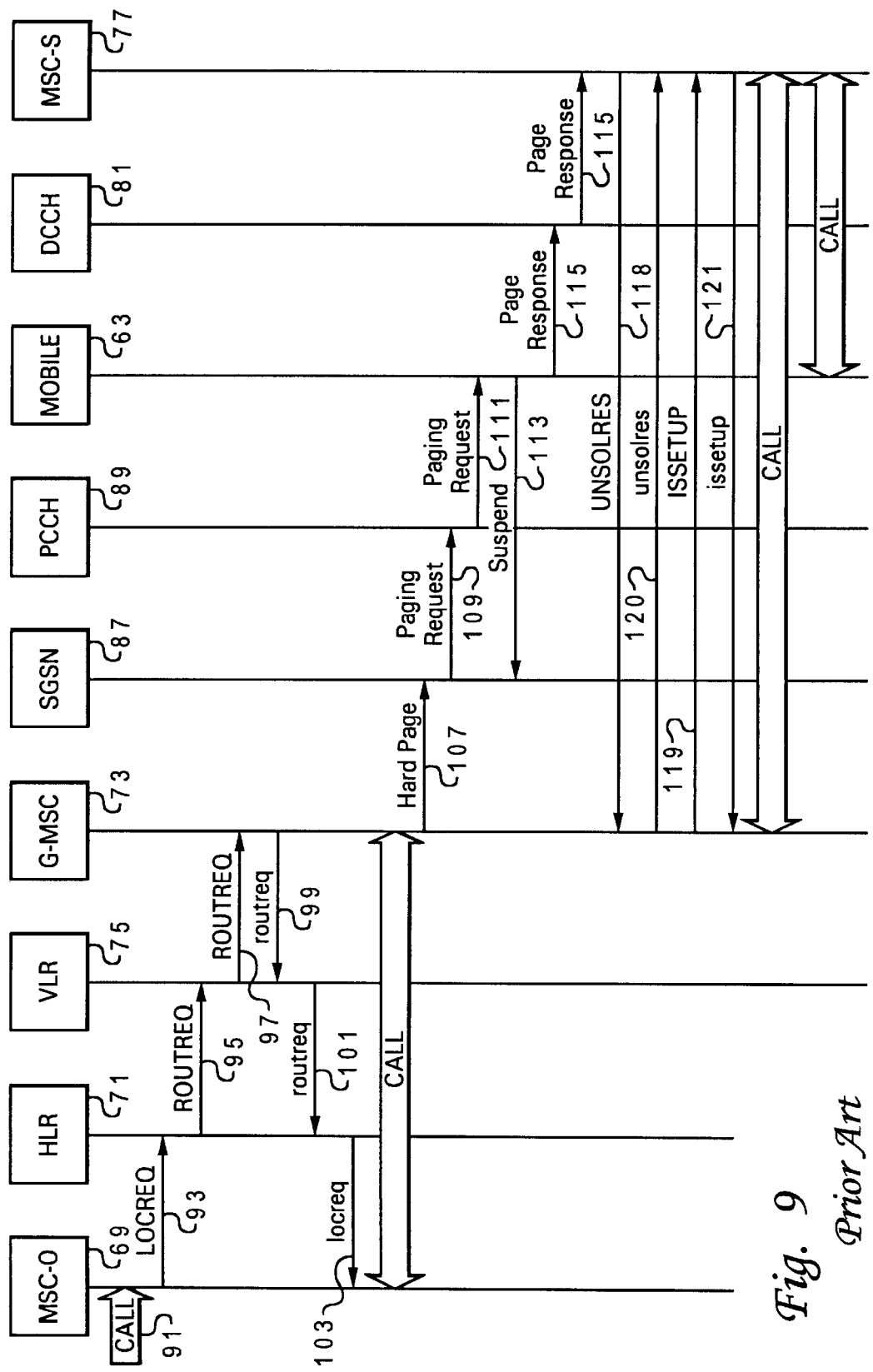
FIG. 9 is a call flow diagram of an alternative call delivery in a system of the type illustrated in FIG. 6 according to the prior art.

Referring now to FIG. 9, there is shown a call flow diagram of an alternative call completion according to the prior art in a GPRS system of the type illustrated FIG. 6. A call 91 to mobile unit 63 is received at MSC-O 69. MSC-O 69 sends a LOCREQ 93 to HLR 71. HLR 71 determines that mobile unit 77 is registered with VLR 75. Accordingly, HLR 71 sends a ROUTREQ 95 to VLR 75, which in turn sends a ROUTREQ 97 to G-MSC 73. According to the prior art, the receipt of ROUTREQ 97 at G-MSC 73 triggers a routreq 99 back to VLR 75, which in turn sends a routreq 101 back to HLR 71. Upon receipt of the routreq 101, HLR 71 sends a locreq 103 back to MSC-O 69. When MSC-O 69 receives locreq 103, the call is connected between MSC-O 69 and G-MSC 73.

When G-MSC 73 receives the call, G-MSC 73 sends a hard page 107 to SGSN 87. Upon receipt of hard page 107, SGSN 87 sends a paging request 109 to PCCH 89, which forwards a paging request 111 to mobile unit 63. Mobile unit 63 responds to SGSN 87 with a suspend 113, and retunes to the DCCH frequency. Then, mobile unit 63 sends a page response 115 on DCCH 81 to MSC-S 77. Upon receipt of page response 115, MSC-S 77 sends an unsolicited response (UNSOLRES) 118 to G-MSC 73. An UNSOLRES is the invoke message that IS-41 instructs an MSC-S to use when a page response is received that the MSC-S did not request. G-MSC 73 responds with an unsolres return result 120, and sends an ISSETUP message 119 to MSC-S 77. When MSC-S 77 responds with an issetup return result 121, the call is connected between G-MSC 73 and mobile unit 63, thus connecting the calling party with mobile unit 63. From the foregoing, it may again be seen that in the prior art, the call is set up completely between MSC-O 69 and G-MSC 73, before call setup is even initiated between G-MSC 73 and mobile unit 63.

Figure 10:
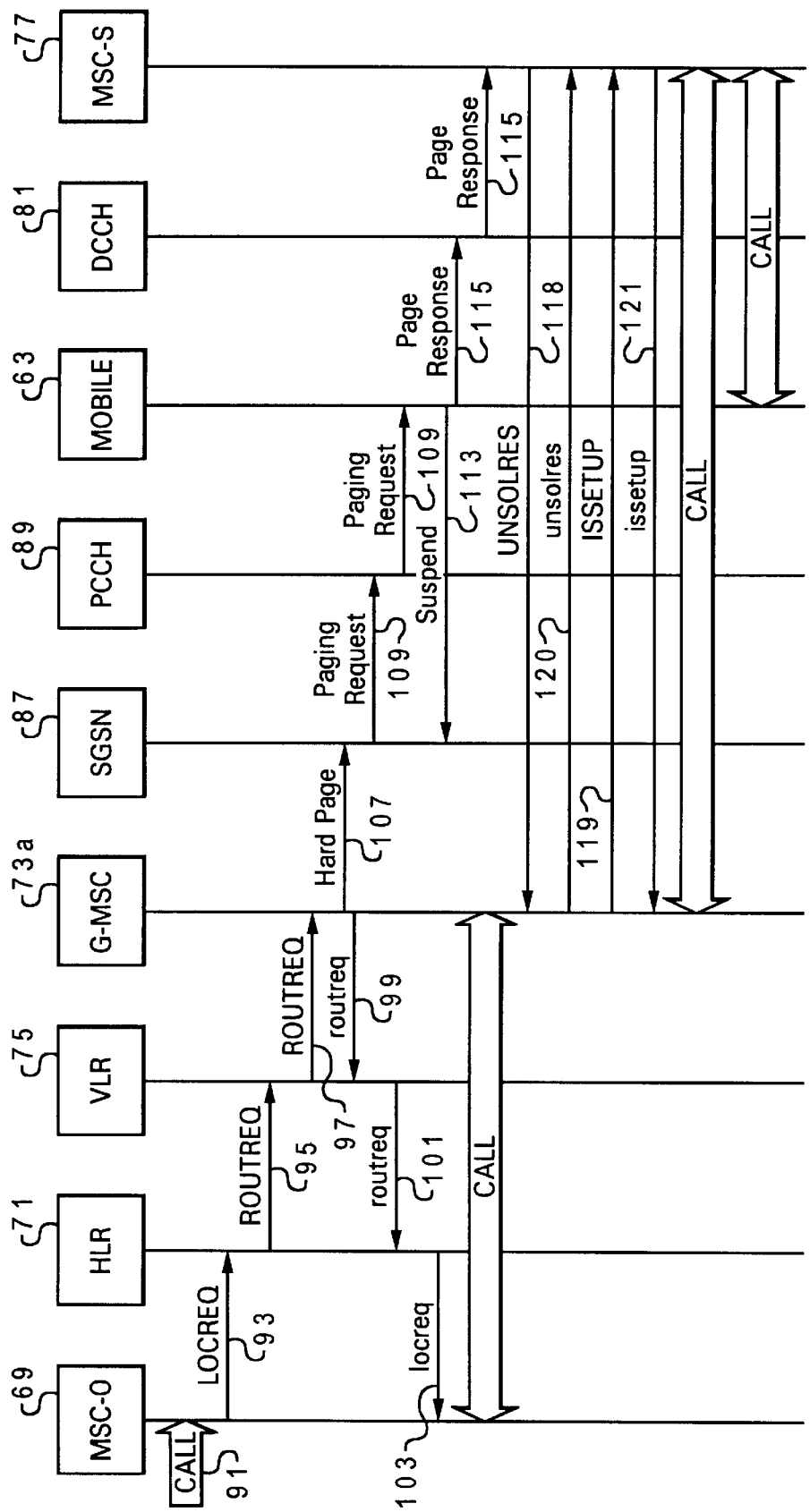
FIG. 10 is a call flow diagram of an alternative call delivery in a system of the type illustrated in FIG. 6 according to the present invention.

Referring now to FIG. 10, there is shown a call flow diagram of an alternative call completion according to the present invention in a GPRS system of the type illustrated FIG. 6. Again, call 91 to mobile unit 63 is received at MSC-O 69. MSC-O 69 sends a LOCREQ 93 to HLR 71. HLR 71 determines that mobile unit 63 is registered with VLR 75 and sends a ROUTREQ 95 to VLR 75, which in turn sends a ROUTREQ 97 to G-MSC 73*a*.

According to the present invention, the receipt of ROUTREQ 97 at G-MSC 73*a* substantially simultaneously triggers a hard page 107 to SGSN 87 and a routreq 99 back to VLR 75. Then, according to the present invention and generally in the manner described with respect to FIGS. 3, 5, and 8, the completion of call setup between MSC-O 69 and G-MSC 73*a*, and the call setup between G-MSC 73*a* and mobile unit 63 proceed independently and concurrently along separate paths. VLR 75 sends a routreq 101 back to HLR 71. Upon receipt of the routreq 101, HLR 71 sends a locreq 103 back to MSC-O 69. When MSC-O 69 receives locreq 103, the call is connected between MSC-O 69 and G-MSC 73*a*.

Concurrently, the receipt of hard page 107, SGSN 87 sends a paging request 109 on PCCH 89 to mobile unit 63. Mobile unit 63 responds to SGSN 87 with a suspend 113, and retunes to the DCCH frequency. Then, mobile unit 63 sends a page response 115 on DCCH 81 to MSC-S 77. Upon receipt of page response 115, MSC-S 77 sends an UNSOL-RES 118 to G-MSC 73*a*. G-MSC 73*a* responds with an unsolres return result 120, and sends an ISSETUP message 119 to MSC-S 77. When MSC-S 77 responds with an issetup return result 121, the call is connected between G-MSC 73 and mobile unit 63, thus connecting the calling party with mobile unit 63.

From the foregoing, it may be seen that the present invention reduces call setup time by initiating setup of the call between the serving or gateway MSC and the mobile unit before completion of call setup between the originating MSC and the serving or gateway MSC. In the present invention, the two phases of call setup proceed at least partially in parallel, rather than serially as in the prior art. The present invention results in substantially decreased call setup time for calls to mobile units that have roam outside their home area or to GPRS mobile units.

While the invention has been described with respect to presently preferred embodiments, those skilled in the art will recognize alternative embodiments and implementations. Accordingly, the foregoing is intended for purposes of illustration and not of limitation.

What is claimed is:

1. A wireless system mobile switching center, which comprises:

means for receiving a call setup request message;

means for issuing a page in response to receiving said call setup request message; and means for issuing a call setup response message substatally simultaneously with said page.

2. The wireless system mobile switching center as claimed in claim 1, wherein said mobile switching center is a serving mobile switching center and said page is issued to a mobile unit.

3. The wireless system mobile switching center as claimed in claim 1, wherein said mobile switching center is an anchor mobile switching center and said page is an ISPAGE2 issued to a boundary mobile switching center.

4. The wireless system mobile switching center as claimed in claim 1, wherein said mobile switching center is a gateway mobile switching center and said means for issuing a page includes means for issuing an ISPAGE2 to a serving mobile switching center.

5. The wireless system mobile switching center as claimed in claim 4, wherein said means for issuing a page includes means for issuing a hard page to a serving GPRS support node.

6. A method delivering calls in a wireless network, which comprises the steps of:

receiving a call setup request message at a mobile switching center;

and then, substantially simultaneously, issuing a page and a call setup response message.

7. The method as claimed in claim 1, wherein said mobile switching center is a serving mobile switching center and said page is issued to a mobile unit.

8. The method as claimed in claim 1, wherein said mobile switching center is an anchor mobile switching center and said page is an ISPAGE2 issued to a boundary mobile switching center.

9. The method as claimed in claim 1, wherein said mobile switching center is a gateway mobile switching center and said step of issuing a page includes the step of issuing an ISPAGE2 to a serving mobile switching center.

10. The method as claimed in claim 9, wherein said step of issuing a page includes the step of issuing a hard page to a serving GPRS support node.

11. The method as claimed in claim 1, wherein said call setup request message is a route request message.

12. The method as claimed in claim 1, wherein said page is issued in response to receiving said call setup request message.

* * * * *